United States Patent
Lee et al.

(10) Patent No.: US 12,052,513 B2
(45) Date of Patent: *Jul. 30, 2024

(54) IMAGE PROCESSORS AND IMAGE PROCESSING METHODS

(71) Applicant: Samsung Electronics Co., Ltd., Suwon-si (KR)

(72) Inventors: Seok Hyun Lee, Seoul (KR); Whee Woong Lee, Suwon-si (KR); Kyung Ah Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,629

(22) Filed: Aug. 16, 2023

(65) Prior Publication Data

US 2023/0396890 A1    Dec. 7, 2023

Related U.S. Application Data

(63) Continuation of application No. 17/328,147, filed on May 24, 2021, now Pat. No. 11,758,284, which is a
(Continued)

(30) Foreign Application Priority Data

Jan. 7, 2019 (KR) .................. 10-2019-0001524

(51) Int. Cl.
*H04N 23/80* (2023.01)
*G06T 1/20* (2006.01)
(Continued)

(52) U.S. Cl.
CPC ............... *H04N 23/80* (2023.01); *G06T 1/20* (2013.01); *G06T 3/40* (2013.01); *G06T 5/73* (2024.01)

(58) Field of Classification Search
CPC ............ H04N 5/23245; H04N 5/23229; G06T 1/20
See application file for complete search history.

(56) References Cited

U.S. PATENT DOCUMENTS 6,985,181 B2    1/2006   Ewedemi et al.
7,542,070 B2    6/2009   Kinjo
(Continued)

FOREIGN PATENT DOCUMENTS

CN         1765126 A     4/2006
JP         H11-32217 A   2/1999
(Continued)

OTHER PUBLICATIONS

Office Action dated Jan. 30, 2023 issued in corresponding Chinese patent application No. 202010003714.3.
(Continued)

*Primary Examiner* — Christopher K Peterson
(74) *Attorney, Agent, or Firm* — Harness, Dickey & Pierce, P.L.C.

(57) ABSTRACT

Image processor circuitry includes a memory storing a program of instructions, and processing circuitry configured to execute the program of instructions to receive input data from an image sensor and detect an operation mode of the image sensor based on the input data, provide configuration data determined in association with the operation mode of the image sensor, and process image data in the input data in accordance with the operation mode and the configuration data.

20 Claims, 14 Drawing Sheets

Related U.S. Application Data continuation of application No. 16/668,798, filed on Oct. 30, 2019, now Pat. No. 11,025,816.

(51) Int. Cl.
*G06T 3/40* (2024.01)
*G06T 5/73* (2024.01)

(56) References Cited

U.S. PATENT DOCUMENTS

| | | | |
|---|---|---|---|
| 9,491,367 | B2 | 11/2016 | Lee et al. |
| 10,701,278 | B2 | 6/2020 | Guicquero et al. |
| 10,834,358 | B1 | 11/2020 | Harrison et al. |
| 11,025,816 | B2 * | 6/2021 | Lee .................. H04N 23/667 |
| 11,758,284 | B2 * | 9/2023 | Lee .................. H04N 23/80 |
| 2005/0041123 | A1 | 2/2005 | Ansari et al. |
| 2007/0096775 | A1 | 5/2007 | Elgebaly et al. |
| 2010/0238328 | A1 | 9/2010 | Pillman et al. |
| 2011/0074971 | A1 | 3/2011 | Kwon |
| 2013/0063349 | A1 | 3/2013 | Rankin |
| 2013/0315555 | A1 | 11/2013 | Shim |
| 2016/0239936 | A1 | 8/2016 | Baek |
| 2016/0323508 | A1 | 11/2016 | Ayalasomayajula et al. |
| 2017/0006224 | A1 | 1/2017 | Kim et al. |
| 2017/0244890 | A1 | 8/2017 | Lee et al. |
| 2018/0296065 | A1 | 10/2018 | Ono et al. |
| 2019/0141255 | A1 | 5/2019 | Hamano et al. |

FOREIGN PATENT DOCUMENTS

| | | |
|---|---|---|
| JP | 2009207155 A | 9/2009 |
| JP | 3159906 U | 6/2010 |
| JP | 2010-183565 A | 8/2010 |
| JP | 2016-076760 A | 5/2016 |
| KR | 10-2014-0023386 A | 2/2014 |
| KR | 10-2018-0020565 A | 2/2018 |

OTHER PUBLICATIONS

Korean Office Action dated Feb. 28, 2023 issued in corresponding Korean Appln. No. 10-2019-0001524.
Office Action issued Aug. 18, 2023 in Chinese Application No. 202010003714.3.

* cited by examiner

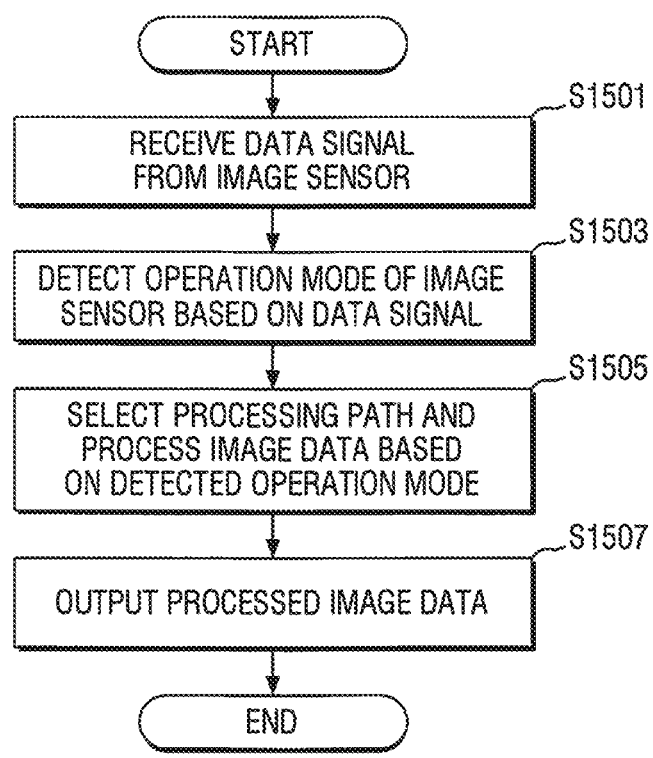

IMAGE PROCESSORS AND IMAGE PROCESSING METHODS

CROSS-REFERENCE TO RELATED APPLICATIONS

This is a continuation of U.S. application Ser. No. 17/328,147, filed on May 24, 2021, which is a continuation of U.S. application Ser. No. 16/668,798, filed Oct. 30, 2019, which claims priority from Korean Patent Application No. 10-2019-0001524 filed on Jan. 7, 2019 in the Korean Intellectual Property Office, and all the benefits accruing therefrom under 35 U.S.C. 119, the contents of each of which in their entirety are herein incorporated by reference.

BACKGROUND

1. Technical Field

The present disclosure relates to image processors and/or image processing methods.

2. Description of the Related Art

An image sensor may have various operation modes for capturing an image of an object ("shooting a subject"). For example, when the object ("subject") is moving at a relatively high velocity in relation to the image sensor, the image sensor may generate image data having a relatively high framerate (e.g., high frames per second (fps)) based on operating in a high-speed shooting mode. In another example, when the object ("subject") is moving at a relatively low or no velocity in relation to the image sensor, the image sensor may generate image data having a relatively low framerate (e.g., low frames per second) based on operating in a low-speed shooting mode. In some cases where a plurality of image sensors is provided, each image sensor may shoot a subject in a different operation mode.

The image data generated by an image sensor is transmitted to an image processing device (or an image processor, and an image signal processor) for image signal processing. Then, the image processor processes the image data in accordance with the operation mode in which the image sensor shoots the subject. For example, when the image sensor transfers the image data captured in the high-speed shooting mode to the image processor, the image processor executes processing on the image frame at high speed so that distortion or delay of the output image does not occur.

In order for the image processor to synchronize its own operation with the operation mode of the image sensor, the operation of the image processor may incur additional time to acquire information on the operation mode of the image sensor, in addition to the time at which the image data is transferred from the image sensor to the image processor. Such additional time may cause distortion or delay of the output image.

SUMMARY

Aspects of the present disclosure provide image processors and/or image processing methods capable of allowing an image processor to directly recognize an operation mode of an image sensor without depending on other devices so that the delay time may be shortened or minimized, in a system in which the image sensor and the image processor operate independently.

According to some example embodiments, image processing circuitry may include a memory storing a program of instructions, and processing circuitry configured to execute the program of instructions to receive input data from an image sensor and detect an operation mode of the image sensor based on the input data, provide configuration data determined in association with the operation mode of the image sensor, and process image data in the input data in accordance with the operation mode and the configuration data.

According to some example embodiments, image processing circuitry may include a memory storing a program of instructions, and processing circuitry configured to execute the program of instructions to receive input data from an image sensor and detect an operation mode of the image sensor based on the input data, and process image data in the input data through a selected processing path of a plurality of processing paths, the selected processing path selected in accordance with the operation mode, each processing path including one or more image processing cores.

According to some example embodiments, image processing circuitry may include a memory storing a program of instructions, and processing circuitry configured to execute the program of instructions to receive first input data from a first image sensor and detect a first operation mode of the first image sensor based on the first input data, receive second input data from a second image sensor and detect a second operation mode of the second image sensor based on the second input data, provide first configuration data determined in association with the first operation mode, process first image data included in the first input data in accordance with the first operation mode and the first configuration data, provide second configuration data determined in association with the second operation mode, and process second image data included in the second input data in accordance with the second operation mode and the second configuration data.

According to some example embodiments, an image processing method may include receiving input data from an image sensor, detecting an operation mode of the image sensor based on the input data, and processing image data in the input data, using configuration data determined in association with the operation mode of the image sensor.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail example embodiments thereof with reference to the attached drawings, in which:

FIG. 15 is a flowchart for explaining an image processing method according to some example embodiments of the present disclosure.

DETAILED DESCRIPTION OF THE EMBODIMENTS

Figure 1:
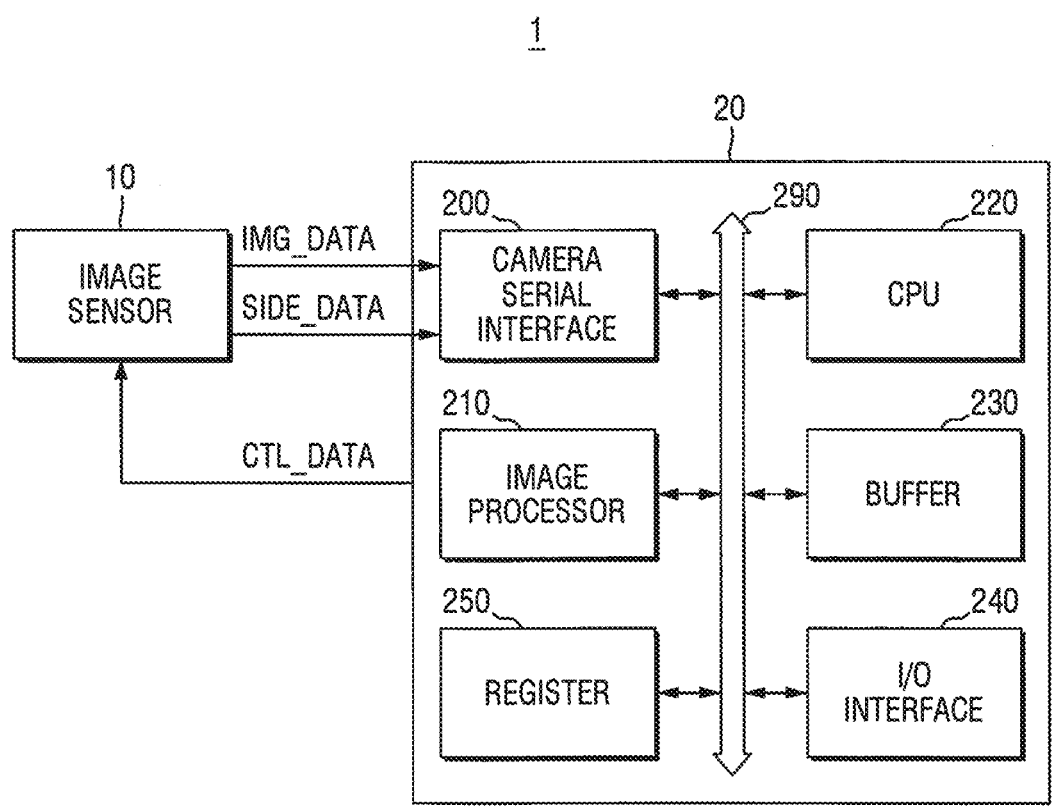
FIG. 1 is a block diagram for explaining an image processing system according to some example embodiments of the present disclosure.

FIG. 1 is a block diagram for explaining an image processing system according to some example embodiments of the present disclosure.

Referring to FIG. 1, an image processing system 1 according to some example embodiments of the present disclosure includes an image sensor 10 and a SoC (System-on-Chip) 20 that is an instance of integrated circuitry (also referred to as "chip") that integrates all components of a computer or other electronic system. Here, the SoC 20 may be implemented as an AP (Application Processor), but the scope of the present disclosure is not limited thereto.

The image sensor 10 may operate under the control of the SoC 20. In some example embodiments, the image sensor 10 may receive a control data CTL_DATA from the SoC 20 and start or end shooting according to the control data CTL_DATA.

Figure 2:
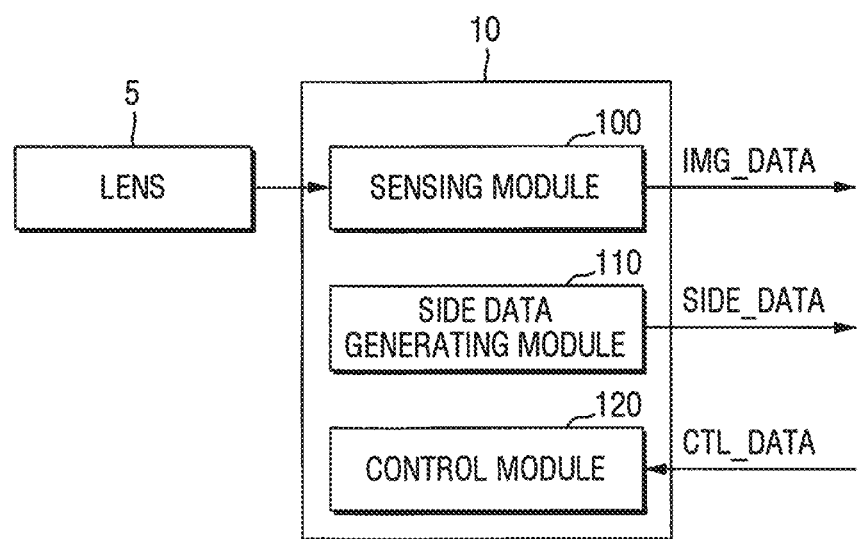
FIG. 2 is a block diagram for explaining an image sensor of the image processing system illustrated in FIG. 1.

The image sensor 10 shoots a subject using a lens 5 illustrated in FIG. 2, and generates an image data IMG_DATA. Further, the image sensor 10 may transmit the image data IMG_DATA generated as the shooting result to the SoC 20.

Specifically, the image sensor 10 may capture a subject in various ways to generate various image data IMG_DATA. In some example embodiments, the image sensor 10 may generate a single image data, generate (e.g., continuous) multiple image data or generate video data. As still another example, the image sensor 10 may generate high-resolution image data with a high number of pixels or generate low-resolution image data with a low number of pixels. As still another example, the image sensor 10 may generate high-speed captured image data with high frames per second or generate low-speed captured image data with low frames per second. As still another example, the image sensor 10 may also generate scaled-down image data. Here, the scale-down image data may be image data that provides a preview image provided to a user before and after the user shoots still images or moving images. That is, the image sensor 10 may generate image data of the actual resolution set in the shooting mode while the user takes a picture, and the image sensor 10 may generate the scale-down image data which is lower than the actual resolution set in the shooting mode for the preview image provided before and after the user shoots.

The image sensor 10 may also generate side-band data SIDE_DATA. The side-band data SIDE_DATA may include additional information on ("associated with") the image data IMG_DATA. Here, the side-band data SIDE_DATA may include information on the operation mode of the image sensor 10. Information on the operation mode may include, in some example embodiments, information on whether the image sensor 10 shoots the still image, the continuous image or video, or information such as the shooting resolution, the shooting speed, presence or absence of the scale-down, and the scale-down resolution. However, the scope of the present disclosure is not limited to the above description, and various types of information may be included in the side-band data SIDE_DATA depending on the actual implementation purpose and environment. The image sensor 10 may also transmit such side-band data SIDE_DATA to the SoC 20.

The image sensor 10 may transmit image data IMG_DATA and side-band data SIDE_DATA to the SoC 20 in various manners. In some example embodiments, the image sensor 10 may transmit the image data IMG_DATA and the side-band data SIDE_DATA to a camera serial interface 200, and to this end, the image data IMG_DATA and the side-band data SIDE_DATA may be serialized in various forms depending on various policies. The serialized image data IMG_DATA and the side-band data SIDE_DATA may be transmitted to the image processor 210 via the camera serial interface 200. In some example embodiments, the image sensor 10 may include processing circuitry such as hardware including logic circuits; a hardware/software combination such as a processor executing software; or a combination thereof. In some example embodiments, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the image sensor 10 may include a memory storing a program of instructions and processing circuitry configured to execute the program of instructions to implement one or more of the elements of the image sensor 10, including one or more modules of the image sensor 10 as described herein.

The SoC 20 may include the camera serial interface 200, the image processer 210, a CPU (Central Processing Unit) 220, a buffer 230, an I/O interface 240, a register 250, and the like, but this is only an example, and the scope of the present disclosure is not limited thereto. In some example embodiments, the SoC 20 may include processing circuitry such as hardware including logic circuits; a hardware/software combination such as a processor executing software; or a combination thereof. In some example embodiments, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. In some example embodiments, the SoC 20 may include a memory storing a program of instructions and processing circuitry configured to execute the program of instructions to implement one or more of the elements of the SoC 20, including one or more of the camera serial interface 200, the image processer 210, the CPU 220, the buffer 230, the I/O interface 240, the register 250, and the like.

The camera serial interface 200 supports the data movement between the image sensor 10 and the image processer 210. In particular, when the image sensor 10 and the image processor 210 operate independently without being implemented as a single chip, the camera serial interface 200 is disposed between them to support transfer of data.

The image processor 210 processes the image data IMG_DATA provided from the image sensor 10. In some example embodiments, the image processor 210 may perform at least one computation on the image data IMG_DATA to encode the image data IMG_DATA. Here, the at least one computation may include, a Bayer transformation, a demosaicing, a noise reduction, an image sharpening, an image stabilization, a color space conversion, a compression, and the like, but the scope of the present disclosure is not limited thereto. The image processor 210, which may also be referred to as "image processing circuitry", may include processing circuitry such as hardware including logic circuits; a hardware/software combination such as a processor executing software; or a combination thereof. In some example embodiments, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the image processor 210 may include a memory storing a program of instructions and processing circuitry configured to execute the program of instructions to implement one or more of the elements of the image processor 210, including one or more of the modules of the image processor 210 as described herein.

The CPU 220 may generally control the SoC 20. Specifically, the CPU 220 may execute a program including instructions for operating not only the image processor 210 but several elements of the SoC 20.

The buffer 230 provides a space in which data may be temporarily stored. In some example embodiments, the image processor 210 may temporarily store the image data in the buffer 230 as necessary. In addition, a program executed by the CPU 220 may be loaded on the buffer 230, and data used by the program may be stored in the buffer 230. The buffer 230 may be implemented as, in some example embodiments, a SRAM (Static Random Access Memory), a DRAM (Dynamic Random Access Memory) and the like, but the scope of the present disclosure is not limited thereto, and the buffer may also be implemented as a nonvolatile memory. The buffer 230 may include a memory, also referred to as a storage device.

The I/O interface 240 provides data exchange with external devices located outside the SoC 20. In some example embodiments, the image data processed by the image processor 210 is transferred to the display device via the I/O interface 240 and may be expressed visually to the user. The I/O interface 240, which may also be referred to as "I/O interface circuitry", may include processing circuitry such as hardware including logic circuits; a hardware/software combination such as a processor executing software; or a combination thereof. In some example embodiments, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The register 250 also provides a space which may store data. In some example embodiments of the present disclosure, the buffer 230 and the register 250 store configuration data CFG_DATA which is determined in advance in association with the operation mode of the image sensor 10, and may provide the configuration data CFG_DATA to the configuration data providing module 216. The details thereof will be described later with reference to FIG. 4. The register 250, which may also be referred to as "register circuitry", may include processing circuitry such as hardware including logic circuits; a hardware/software combination such as a processor executing software; or a combination thereof. In some example embodiments, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

An internal bus 290 serves as a path through which the elements in the SoC 20, that is, the camera serial interface 200, the image processer 210, the CPU (Central Processing Unit) 220, the buffer 230, the I/O interface 240, the register 250 and the like may mutually transmit and receive data. Here, the internal bus 290 may be implemented as, in some example embodiments, an AXI (Advanced eXtensible Interface) that follows AMBA (Advanced Microcontroller Bus Architecture), but the scope of the present disclosure is not limited thereto.

As illustrated in FIG. 1, when the image sensor 10 and the image processer 210 independently operate, the image processer 210 needs to recognize the operation mode of the image sensor 10. The reason is that, in some example embodiments, when the image sensor 10 generates high-speed captured image data and transmit it to the image processor 210, if the image processor 210 fails to recognize the fact that the image sensor 10 operates in the high-speed shooting mode, distortion or delay of the output image may occur.

Thus, a method of recognizing the operation mode of the image sensor 10 and notifying it to the image processer 210 by the CPU 220 of the SoC 20, and a method of temporarily storing the image data generated by the image sensor 10 in an external memory connected to the image processer 210 and then transmitting it to the image processer 210 may be considered. However, such methods have a problem in which an additional time for acquiring the information on the operation mode of the image sensor 10 is considerably required, in addition to the transfer time of the image data from the image sensor 10 to the image processer 210.

In order to solve this problem, the image processor 210 according to various embodiments of the present disclosure may directly recognize the operation mode of the image sensor 10 without depending on other devices and shorten the delay time. This will be described in detail with reference to FIGS. 2 and 3.

FIG. 2 is a block diagram for explaining the image sensor of the image processing system illustrated in FIG. 1.

Referring to FIG. 2, the image sensor 10 of the image processing system 1 may include a sensing module 100, a side-band data generating module 110, and a control module 120. It will be understood that the image sensor 10 may include a memory storing a program of instructions and processing circuitry configured to execute the program of instructions to implement the sensing module 100, the side-band data generating module 110, and the control module 120.

The sensing module 100 shoots the subject using the lens 5 to generate image data IMG_DATA, and transfers the image data IMG_DATA to the image processer 210 via the camera serial interface 200 of the SoC.

The side-band data generating module 110 generates additional information on the same image data IMG_DATA as explained in FIG. 1 and transfers it to the image processer 210 through the camera serial interface 200 of the SoC 20.

The control module 120 may receive the control data CTL_DATA from the SoC 20 and control the image sensor 10 accordingly. In some example embodiments, after receiving the command of the user, the SoC 20 transmits the control data CTL_DATA, which causes the image sensor 10 to shoot the subject at a specific shooting speed, to the control module 120, and the control module 120 may operate the image sensor 10 accordingly.

Figure 3:
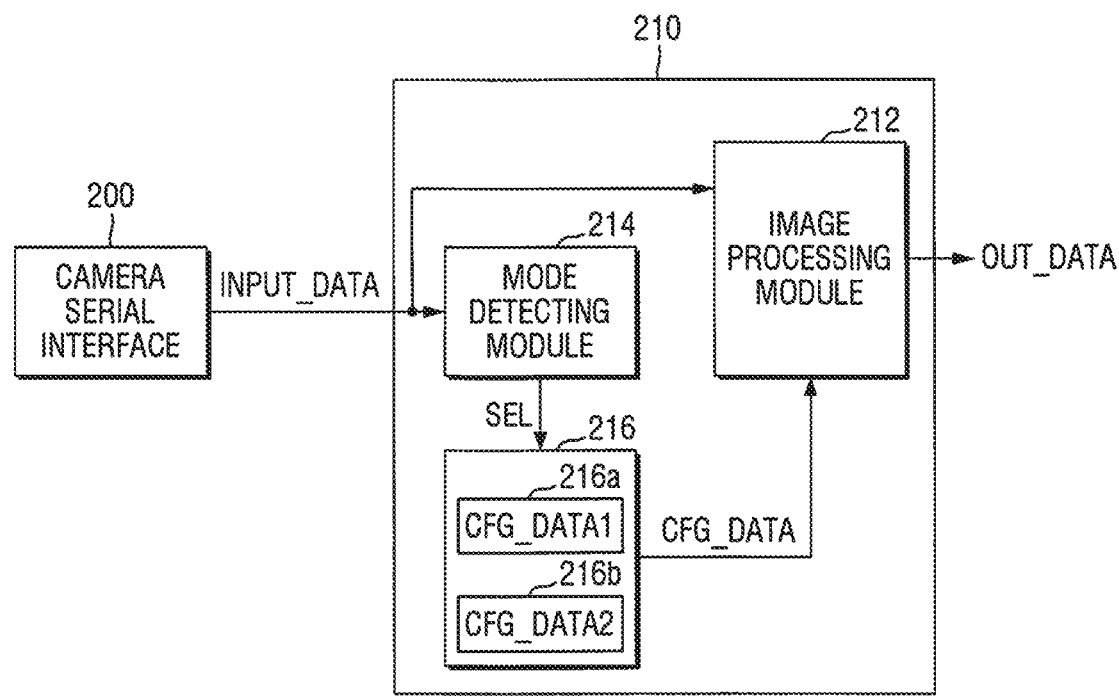
FIG. 3 is a block diagram for explaining some example embodiments of an image processor of the image processing system illustrated in FIG. 1.

Subsequently, FIG. 3 is a block diagram for explaining some example embodiments of the image processor of the image processing system illustrated in FIG. 1.

Referring to FIG. 3, the image processer 210 of the image processing system 1 may include an image processing module 212, a mode detecting module 214 and a configuration data providing module 216. It will be understood that the image processor 210 may include a memory storing a program of instructions and processing circuitry configured to execute the program of instructions to implement the image processing module 212, the mode detecting module 214 and the configuration data providing module 216.

The mode detecting module 214 will be described first. The mode detecting module 214 may receive the input data INPUT_DATA from the image sensor 10 via the camera serial interface 200, and detect the operation mode of the image sensor 10 based on the input data INPUT_DATA.

Here, the input data INPUT_DATA may include the image data IMG_DATA, and the side-band data SIDE_DATA including additional information on ("associated with") the image data IMG_DATA.

The mode detecting module 214 may first detect the operation mode of the image sensor 10 based on the image data IMG_DATA in the input data INPUT_DATA. In some example embodiments, when the frequency per unit time of image frames transmitted to the image data IMG_DATA is high, it is possible to recognize that the operation mode of the image sensor 10 is the high-speed shooting mode. In contrast, when the frequency per unit time of the image frames transmitted to the image data IMG_DATA is low, it is possible to recognize that the operation mode of the image sensor 10 is the low-speed shooting mode.

On the other hand, the mode detecting module 214 may also detect the operation mode of the image sensor 10 based on the side-band data SIDE_DATA in the input data INPUT_DATA. In some example embodiments, the image sensor 10 may include data explicitly representing its operation mode in the side-band data SIDE_DATA via the side-band data generating module 110. Then, the mode detecting module 214 may detect the operation mode of the image sensor 10 based on the value of the data.

As still another example, the image sensor 10 may include, in some example embodiments, data representing a shooting environment, in some example embodiments, data on surrounding brightness at the time of shooting, in the side-band data SIDE_DATA via the side-band data generating module 110. Then, the mode detecting module 214 may analogize the operation mode of the image sensor 10 based on the value of the data.

The image processing module 212 may process the image data IMG_DATA in the input data INPUT_DATA in accordance with the detected operation mode.

Specifically, as described above, after recognizing the operation mode of the image sensor 10 based on at least one of the image data IMG_DATA and the side-band data SIDE_DATA of the input data INPUT_DATA, the image processing module 212 may process the input data INPUT_DATA depending on the detected operation mode in order to generate a normal output image.

In some example embodiments, after recognizing that the operation mode of the image sensor 10 is the high-speed shooting mode, the image processing module 212 may change the setting of the image processing module 212 to execute the image processing at high speed. Alternatively, after recognizing that the operation mode of the image sensor 10 is the low-speed shooting mode, the setting of the image processing module 212 may be changed to execute the image processing at a low speed. As still another example, after the image processing module 212 recognizes that the shooting environment of the image sensor 10 was a night shooting environment with very low brightness, the setting of the image processing module 212 may be changed to additionally execute the noise removal processing. As still another example, the image processing module 212 recognizes that the operation mode of the image sensor 10 is a scale-down shooting mode for the preview image, and performs processing on the image with reduced resolution. Then, if the operation mode of the image sensor 10 shifts to the operation mode for actual shooting rather than the preview image, the image processing module 212 recognizes the shift and may perform the processing on the image of the actual resolution set in the shooting mode.

The configuration data providing module 216 may store the configuration data CFG_DATA determined in advance in association with the operation mode of the image sensor 10 in the register 250 or the buffer 230, read the configuration data CFG_DATA stored in the register 250 or the buffer 230, and provide it to the image processing module 212. The configuration data CFG_DATA includes data that may change the operation of the image processing core inside the image processing module 212 as described above. Accordingly, the image processing module 212 may process image data IMG_DATA in the input data INPUT_DATA in accordance with both the detected operation mode of the image sensor 10 and the configuration data CFG_DATA. In some example embodiments of the present disclosure, when the configuration data CFG_DATA is stored in the buffer 230, the register 250 stores the address information on the position at which the configuration data CFG_DATA is stored in the memory region of the buffer 230, and the configuration data providing module 216 may read the configuration data CFG_DATA stored in the buffer 230, using the aforementioned address information. However, the scope of the present disclosure is not limited thereto.

In some example embodiments, the register 250 or the buffer 230 may store the configuration data CFG_DATA1

216a that may be applied to the image processing module 212 when the operation mode of the image sensor 10 is the high-speed shooting mode. Further, the register 250 or the buffer 230 may store the configuration data CFG_DATA2 216b that may be applied to the image processing module, when the operation mode of the image sensor 10 is the low-speed shooting mode. Also, when the shooting environment of the image sensor 10 is a night shooting environment, the configuration data applicable to the image processing module 212 may be further included in the register 250 or the buffer 230. Of course, a way in which a part of such configuration data CFG_DATA is stored in the buffer 230, and another part thereof is stored in the register 250 may be implemented.

If the mode detecting module 214 outputs the selection signal SEL having the value appropriately set depending on the detected operation mode to the configuration data providing module 216, the configuration data providing module 216 may provide the configuration data CFG_DATA selected based on the selection signal SEL to the image processing module 212 to change the operation of the image processing module 212.

According to some example embodiments, the image processor 210 may directly perform an operation of receiving the input data INPUT_DATA provided from the image sensor 10 via the mode detecting module 214, and detecting the operation mode of the image sensor 10 from this (e.g., without involvement of the CPU 220). Further, the image processor 210 may also directly perform appropriate changing of the operation of the image processing module 212 depending on the detected operation mode (e.g., without involvement of CPU 220). As a result, even when the image sensor 10 and the image processer 210 independently operate, by reducing or minimizing the delay time, it is possible to prevent, reduce, or minimize the distortion and delay of the output image, thereby improving performance of the image processing system 1 by improving the quality of images generated by the image processing system 1.

Figure 4:
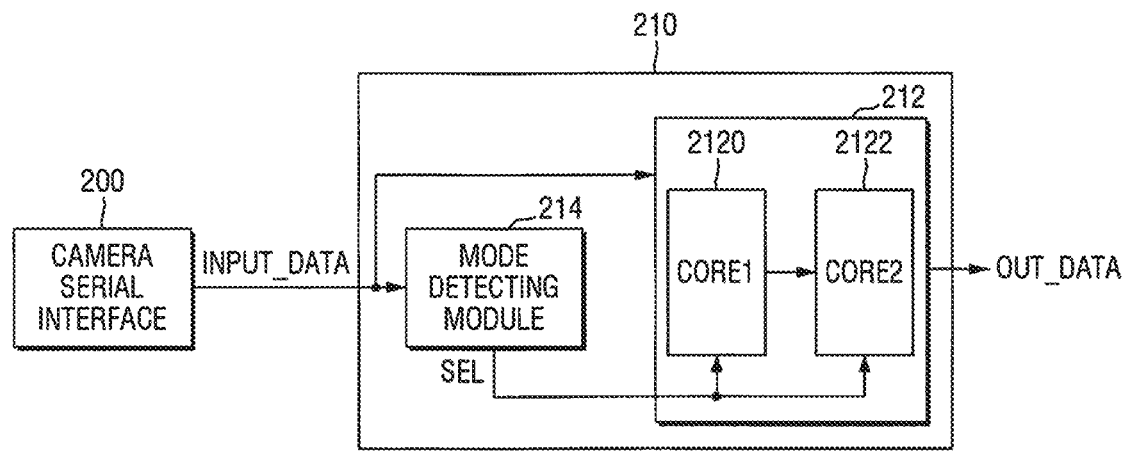
FIG. 4 is a block diagram for explaining some example embodiments of the image processor of the image processing system illustrated in FIG. 1.

FIG. 4 is a block diagram for explaining some example embodiments of the image processor of the image processing system illustrated in FIG. 1.

Referring to FIG. 4, the image processing module 212 of the image processor 210 may include a first image processing core 2120 of a first stage, and a second image processing core 2122 of a second stage. Restated, processing circuitry of the image processor 210 may execute a program of instructions to implement the image processing module 212 and thus may implement the first image processing core 2120 of a first stage, and the second image processing core 2122 of a second stage.

The mode detecting module 214 may output a selection signal SEL which, when received at the image processing module 212, causes the image processing module 212 to select at the first image processing core 2120, the second image processing core 2122, or both the first image processing core 2120 and the second image processing core 2122 as a selected image processing core, and the image processing module 212 may process the image data IMG_DATA, using the selected image processing core.

In some example embodiments, when the selection signal SEL causes the image processing module 212 to select both the first image processing core 2120 and the second image processing core 2122, the image data IMG_DATA may be processed over a plurality of stages. In some example embodiments, when the image processing module 212 recognizes that the shooting environment of the image sensor 10 is a night shooting environment with very low brightness, the first image processing core 2120 may perform a color correction, and the second image processing core 2122 may perform a noise removal.

In some example embodiments, when the selection signal SEL causes the image processing module 212 to select only one of the first image processing core 2120 and the second image processing core 2122, by bypassing the image processing core unnecessary for the processing of the image data IMG_DATA, the delay time may be further shortened, and resources may be saved, thereby improving operational performance and operating efficiency of the image processing system 1, for example by reducing power consumption, improving operational efficiency, some combination thereof, or the like.

Figure 5:
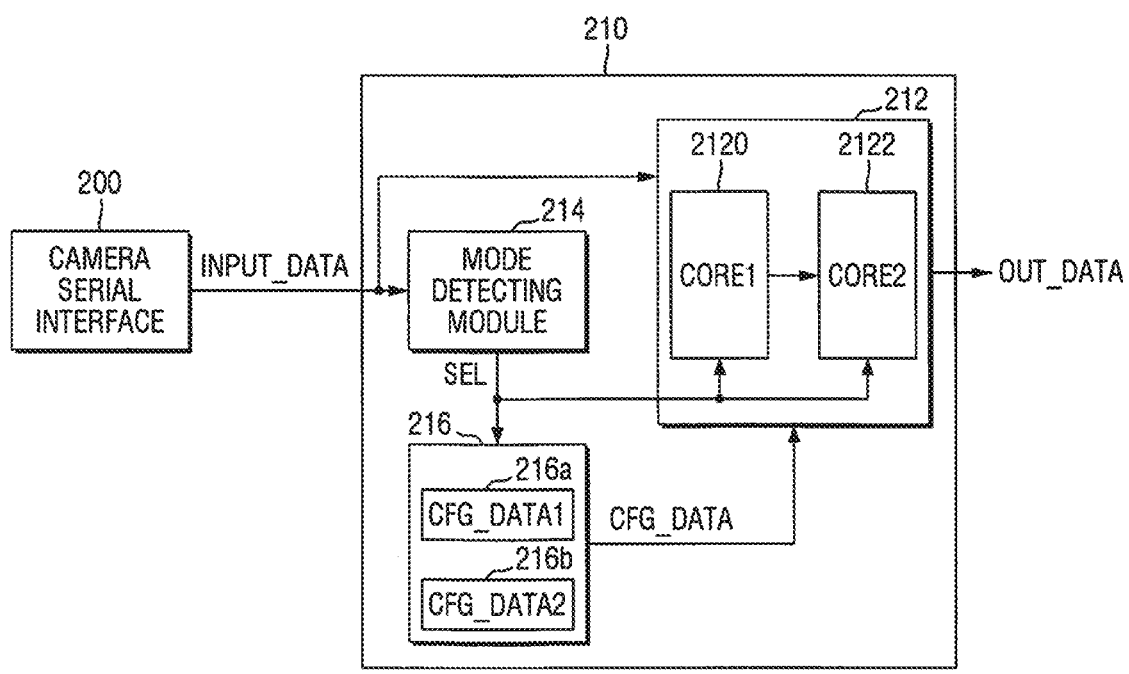
FIG. 5 is a block diagram for explaining some example embodiments of the image processor of the image processing system illustrated in FIG. 1.

FIG. 5 is a block diagram for explaining some example embodiments of the image processor of the image processing system illustrated in FIG. 1.

Referring to FIG. 5, the image processing module 212 of the image processor 210 may include a first image processing core 2120 of a first stage, and a second image processing core 2122 of a second stage, and the first image processing core 2120 and the second image processing core 2122 may be configurable image processing cores (i.e., each image processing core of the first image processing core 2120 and the second image processing core 2122 may be a separate configurable image processing core).

The mode detecting module 214 may output the selection signal SEL to cause the image processing module 212 to select the first image processing core 2120, the second image processing core 2122, or both the first image processing core 2120 and the second image processing core 2122 as a selected image processing core, and the image processing module 212 may process the image data IMG_DATA, using the selected image processing core.

Further, the configuration data providing module 216 may provide the configuration data CFG_DATA selected based on the selection signal SEL to the first image processing core 2120, the second image processing core 2122, or both the first image processing core 2120 and the second image processing core 2122. Restated, the configuration data providing module 216 may be caused to select and provide a particular selected instance of configuration data CFG_DATA, of a plurality of instances of configuration data (e.g., CFG_DATA1 216a and CFG_DATA2 216b), to the first image processing core 2120, the second image processing core 2122, or both the first image processing core 2120 and the second image processing core 2122 based on the selection signal SEL.

In some example embodiments, the selection signal SEL may be implemented to include all data for selecting the image processing core and data for selecting the configuration data CFG_DATA. As a simple example, the selection signal SEL includes multi-bits, the data for selecting the image processing core is expressed using some bits of the multi-bits, and data for selecting the configuration data CFG_DATA may be expressed using some other bits of multi-bits, but the scope of the present disclosure is not limited thereto.

Figure 6:
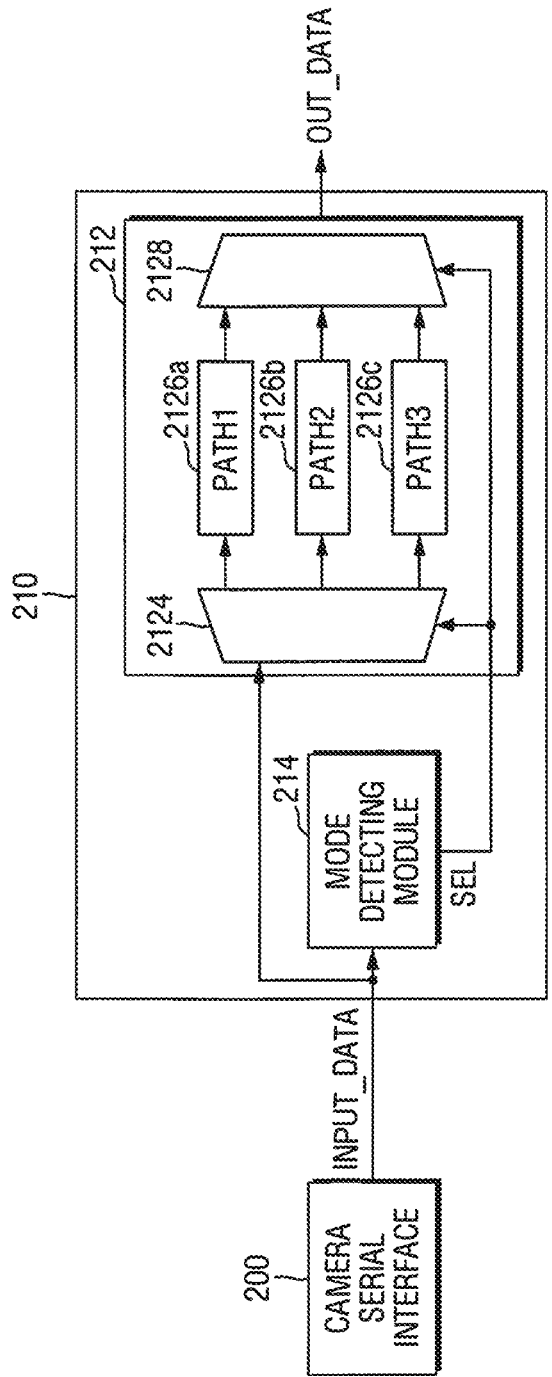
FIG. 6 is a block diagram for explaining some example embodiments of the image processor of the image processing system illustrated in FIG. 1.

FIG. 6 is a block diagram for explaining some example embodiments of the image processor of the image processing system illustrated in FIG. 1.

Referring to FIG. 6, the image processing module 212 of the image processor 210 may include a plurality of processing paths 2126a, 2126b and 2126c coupled in parallel via directors 2124 and 2128, and the plurality of processing paths 2126a, 2126b and 2126c may each include one or more image processing cores. Restated, processing circuitry of the image processor 210 may execute a program of instructions to implement the image processing module 212 and thus may implement a plurality of processing paths 2126a, 2126b and 2126c that each include the implementation of one or more image processing cores. An image processing core included in any of the processing paths 2126a, 2126b, and 2126c may be a configurable image processing core.

The mode detecting module 214 may output a selection signal SEL to cause the image processing module 212 to select one processing path of the plurality of processing paths 2126a, 2126b and 2126c as a selected processing path, and the image processing module 212 may process the image data IMG_DATA through the selected processing path. It will be understood, as described herein, that selecting one processing path of the plurality of processing paths 2126a, 2126b, and 2126c may include manipulating one or more of directors 2124 and 2128. Accordingly, the image processor 210 may process image data IMG_DATA in the input data INPUT_DATA through a selected processing path of the plurality of processing paths 2126a, 2126b and 2126c, where the selected processing path is selected in accordance with the operation mode that is detected by the mode detecting module 214.

The selection signal SEL may be output based on the detected operation mode, such that the selection signal SEL is output to cause selection of the selected processing path in accordance with the detected operation mode. In some example embodiments, when the selection signal SEL causes selection of the processing path 2126a, in some example embodiments, the image data IMG_DATA may be processed at high speed, and when the selection signal SEL causes selection of the processing path 2126b, in some example embodiments, the image data IMG_DATA may be processed at a low speed. As still another example, when the selection signal SEL causes selection of the processing path 2126b, in some example embodiments, the image data IMG_DATA may be processed with high resolution, and when the selection signal SEL causes selection of the processing path 2126b, in some example embodiments, the image data IMG_DATA may be processed with low resolution. As still another example, when the selection signal SEL causes selection of the processing path 2126a, in some example embodiments, the scale-down image data IMG_DATA may be processed, and when the selection signal SEL causes selection of the processing path 2126a, in some example embodiments, the image data IMG_DATA of actual resolution may be processed.

Figure 7:
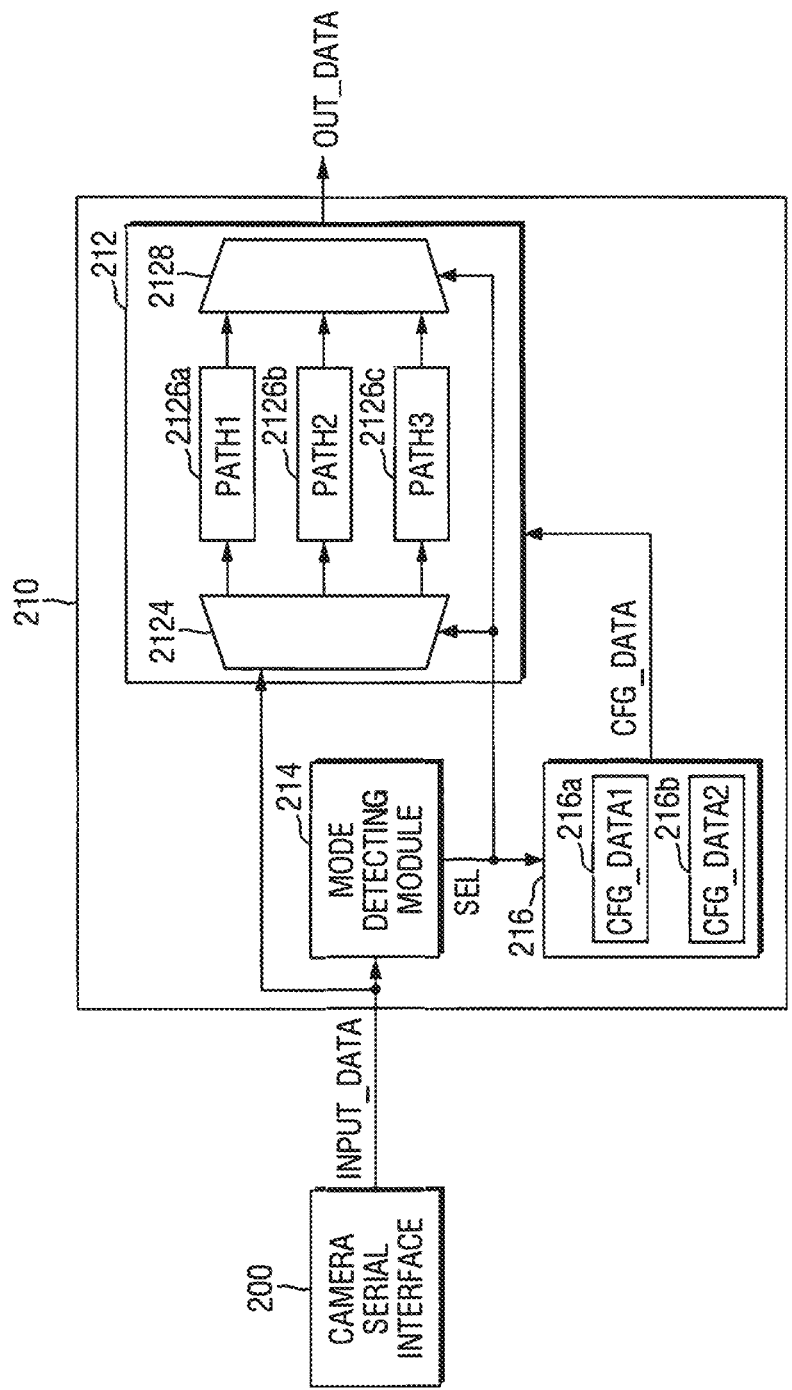
FIG. 7 is a block diagram for explaining some example embodiments of the image processor of the image processing system illustrated in FIG. 1.

FIG. 7 is a block diagram for explaining some example embodiments of the image processor of the image processing system illustrated in FIG. 1.

Referring to FIG. 7, the image processing module 212 of the image processor 210 may include a plurality of processing paths 2126a, 2126b and 2126c, each of the plurality of processing paths 2126a, 2126b and 2126c may include one or more image processing cores, and the image processing cores included in the selected processing path may be configurable image processing cores. Restated, processing circuitry of the image processor 210 may execute a program of instructions to implement the image processing module 212 and thus may implement a plurality of processing paths 2126a, 2126b and 2126c that each include the implementation of one or more image processing cores, and the image processing cores included in the selected processing path may be configurable image processing cores.

The mode detecting module 214 may output the selection signal SEL to cause the image processing module 212 to select one processing path of a plurality of processing paths 2126a, 2126b and 2126c as a selected processing path, and the image processing module 212 may process the image data IMG_DATA through the selected processing path.

Further, the configuration data providing module 216 may provide the configuration data CFG_DATA selected based on the selection signal SEL to the image processing core included in the selected processing path.

In some example embodiments, the selection signal SEL may be implemented to include all of the data for selecting one processing path among the plurality of processing paths 2126a, 2126b and 2126c, and the data for selecting the configuration data CFG_DATA. As a simple example, the selection signal SEL includes multi-bit, and the data for selecting one processing path of the plurality of processing paths 2126a, 2126b and 2126c is expressed, using some bits of the multi-bits, and the data for selecting the configuration data CFG_DATA may be expressed using some other bits of multi-bits, but the scope of the present disclosure is not limited thereto.

Figure 8:
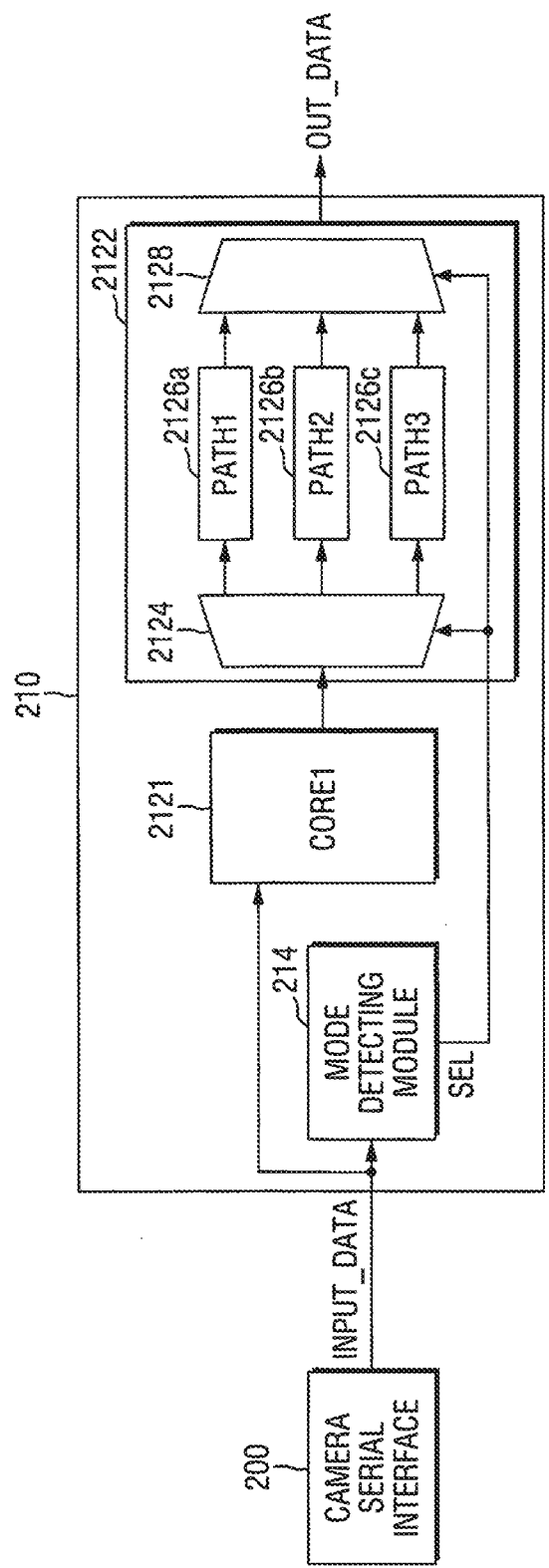
FIG. 8 is a block diagram for explaining some example embodiments of the image processor of the image processing system illustrated in FIG. 1.

FIG. 8 is a block diagram for explaining some example embodiments of the image processor of the image processing system illustrated in FIG. 1.

Referring to FIG. 8, the image processor 210 may further include an external image processing core 2121 outside ("external to") the image processing module 212. Restated, processing circuitry of the image processor 210 may execute a program of instructions to implement the image processing module 212, which may include implementing a plurality of processing paths 2126a, 2126b and 2126c that each include the implementation of one or more image processing cores, and the external image processing core 2121 that is separate from the plurality of processing paths 2126a, 2126b and 2126c. The image processing module 212 may process the image data IMG_DATA via the external image processing core 2121 and the selected processing path.

That is, here, the external image processing core 2121 may be a first stage for processing the image data IMG_DATA, and the selected processing path may be a second stage for processing the image data IMG_DATA. Accordingly, the image processor 210 may process image data IMG_DATA, through an external image processing core 2121, that is separate from the plurality of processing paths 2126a-2126c, and the selected processing path of the plurality of processing paths 2126a-2126c.

Of course, this example embodiment is merely an example, the external image processing core 2121 may be arranged at the rear end side of the image processing module 212, so that the selected processing path may be the first stage for processing the image data IMG_DATA, and the external image processing core 2121 may be the second stage for processing the image data IMG_DATA.

Figure 9:
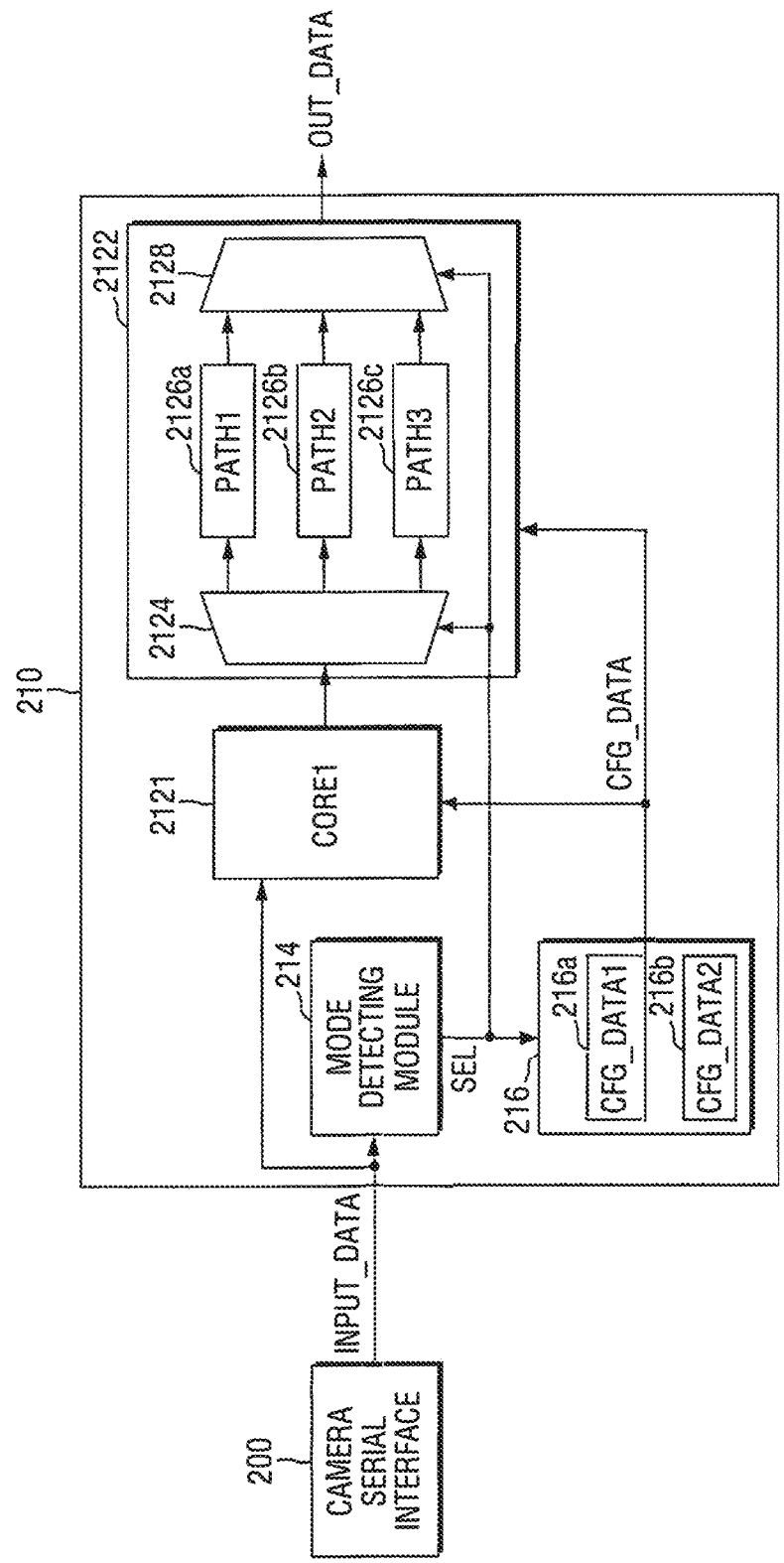
FIG. 9 is a block diagram for explaining some example embodiments of the image processor of the image processing system illustrated in FIG. 1.

FIG. 9 is a block diagram for explaining some example embodiments of the image processor of the image processing system illustrated in FIG. 1.

Referring to FIG. 9, the image processing module 212 of the image processor 210 may further include an image processing core 2120 outside the image processing module 212. Restated, processing circuitry of the image processor 210 may execute a program of instructions to implement the image processing module 212, which may include implementing a plurality of processing paths 2126a, 2126b and 2126c that each include the implementation of one or more image processing cores, and the external image processing core 2121 that is separate from the plurality of processing paths 2126a, 2126b and 2126c. The image processing module 212 may process the image data IMG_DATA via the external image processing core 2121 and the selected processing path, and the external image processing core 2121 may be a configurable image processing core.

Further, the configuration data providing module 216 may provide the configuration data CFG_DATA selected based on the selection signal SEL to the external image processing core 2121, the image processing core included in the selected processing path of the plurality of processing paths 2126a, 2126b and 2126c, or both the external image processing core 2121 and the image processing core included in the selected processing path of the plurality of processing paths 2126a, 2126b and 2126c.

In some example embodiments, the selection signal SEL may be implemented to include all of the data for selecting one processing path among the plurality of processing paths 2126a, 2126b and 2126c, and the data for selecting the configuration data CFG_DATA. As a simple example, the selection signal SEL includes multi-bits, and the data for selecting one processing path of the plurality of processing paths 2126a, 2126b and 2126c may be expressed, using some bits of the multi-bits, and the data for selecting the configuration data CFG_DATA may be expressed using some other bits of multi-bits, but the scope of the present disclosure is not limited thereto.

Figure 10:
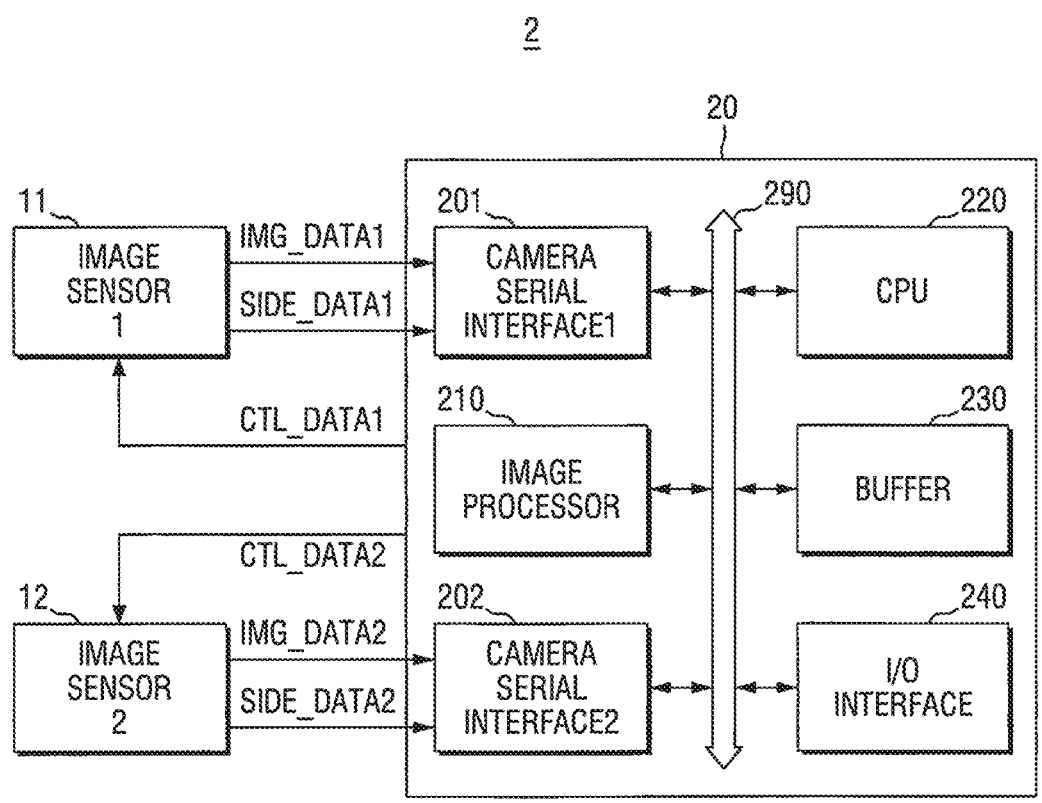
FIG. 10 is a block diagram for explaining an image processing system according to some example embodiments of the present disclosure.
Figure 11:
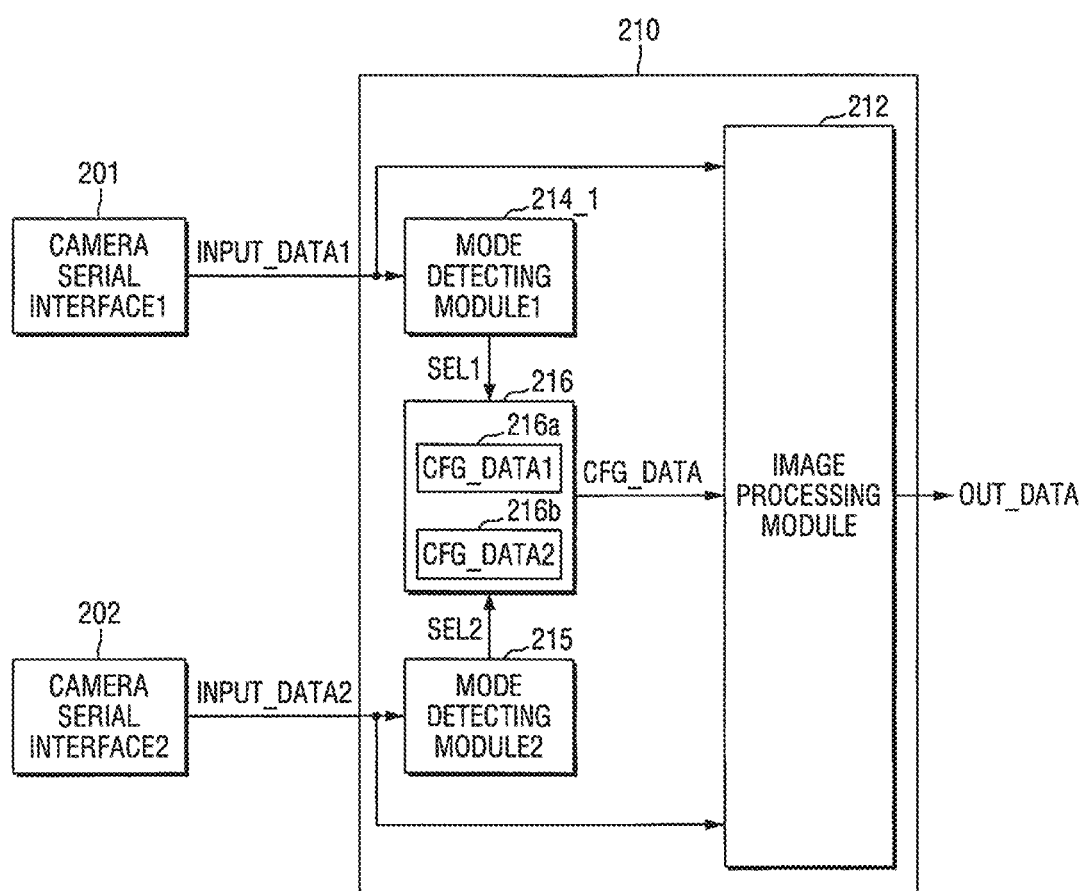
FIG. 11 is a block diagram for explaining some example embodiments of the image processor of the image processing system illustrated in FIG. 10.

FIG. 10 is a block diagram for explaining an image processing system according to some example embodiments of the present disclosure. FIG. 11 is a block diagram for explaining some example embodiments of the image processor of the image processing system illustrated in FIG. 10.

First, referring to FIG. 10, the image processing system 2 according to some example embodiments of the present disclosure includes a first image sensor 11, a second image sensor 12 and a SoC 20.

The first image sensor 11 may operate by receiving the first control data CTL_DATA1 from the SoC 20, and the second image sensor 12 may operate by receiving the second control data CTL_DATA2 from the SoC 20.

The first image sensor 11 shoots a subject using the lens 5, and generates first image data IMG_DATA1 and first side-band data SIDE_DATA1. The second image sensor 12 shoots the subject using the lens 5, and generates second image data IMG_DATA2 and second side-band data SIDE_DATA2. Here, the shooting environment and the shooting mode of the first image sensor 11 may be different from the shooting environment and the shooting mode of the second image sensor 12.

The first image sensor 11 may transmit the first image data IMG_DATA1 and the first side-band data SIDE_DATA1 to the image processer 210 via the first camera serial interface 201, and the second image sensor 12 may transmit the second image data IMG_DATA2 and the second side-band data SIDE_DATA2 to the image processer 210 via the second camera serial interface 202.

Next, referring to FIG. 11, the image processor 210 may include an image processing module 212, a first mode detecting module 214-1, a second mode detecting module 215, and a configuration data providing module 216. It will be understood that the image processor 210 may include a memory storing a program of instructions and processing circuitry configured to execute the program of instructions to implement the image processing module 212, the first mode detecting module 214-1, the second mode detecting module 215, and the configuration data providing module 216.

The first mode detecting module 214-1 may receive the first input data INPUT_DATA1 from the first image sensor 11, and detect the first operation mode of the first image sensor 11 based on the first input data INPUT_DATA1.

The second mode detecting module 215 may receive the second input data INPUT_DATA2 from the second image sensor 12, and detect the second operation mode of the second image sensor 12 based on the second input data INPUT_DATA2.

The image processing module 212 may process the first image data included in the first input data INPUT_DATA1 in accordance with the detected first operation mode, and process the second image data included in the second input data INPUT_DATA2 in accordance with the detected second operation mode.

The register 250 or the buffer 230 may store the first configuration data determined in advance in association with the first operation mode, and the second configuration data determined in advance in association with the second operation mode, and the configuration data providing module 216 provides the first configuration data and the second configuration data to the image processing module 212.

As in the embodiments of FIGS. 4 and 5, the image processing module 212 may include a first image processing core 2120 of the first stage and a second image processing core 2122 of the second stage.

In some example embodiments, the first mode detecting module 214-1 and the second mode detecting module 215 may output a first selection signal SEL1 and a second selection signal SEL2 to cause selection of at least one image processing core of the first image processing core 2120 and the second image processing core 2122 as a selected at least one image processing core, and the image processing module 212 may process the first image data and the second image data, using the selected at least one image processing core.

In some example embodiments, the first image processing core 2120 and the second image processing core 2122 are configurable image processing cores, and the configuration data providing module 216 may provide the first configuration data and the second configuration data each selected by the first selection signal SEL1 and the second selection signal SEL2 to at least one of the first image processing core 2120 and the second image processing core 2122. Restated, the configuration data providing module 216 may provide the first configuration data to at least one first image processing core of the first image processing core 2120 and the second image processing core 2122 based on the first selection signal SEL1 and the second selection signal SEL2, and the configuration data providing module 216 may further provide the second configuration data to at least one second image processing core of the first image processing core 2120 and the second image processing core 2122 based on the first selection signal SEL1 and the second selection signal SEL2. The at least one first image processing core may be same or different from the at least one second image processing core.

As in the embodiments of FIGS. 6 and 7, the image processing module 212 may include a plurality of processing paths, and each of the plurality of processing paths may include one or more image processing cores.

In some example embodiments, the first mode detecting module 214-1 and the second mode detecting module 215 output the first selection signal SEL1 and the second selection signal SEL2 for each selecting one processing path of the plurality of processing paths, and the image processing module 212 may process the first image data and the second image data via the selected processing path. Restated, the image processor 210 may output a first selection signal SEL1 to cause selection of a first selected processing path of the plurality of processing paths, and the image processor 210 may output a second selection signal SEL2 to cause selection of a second processing path of the plurality of processing paths, where the first and second processing paths may be same or different processing paths of the plurality of processing paths.

In some example embodiments, the image processing core included in the selected processing path is a configurable image processing core, and the configuration data providing module 216 may provide the first configuration data and the second configuration data, each selected based on the first selection signal SEL1 and the second selection signal SEL2, respectively, to the image processing cores included in the selected processing path, such that the image processing module 212 may process first image data IMG_DATA1 in the first input data INPUT_DATA1 in accordance with the first operation mode and the first configuration data and may further process second image data IMG_DATA2 in the second input data INPUT_DATA2 in accordance with the second operation mode and the second configuration data. In some example embodiments, the image processor 210 may output the first selection signal SEL1 to cause selection of a first processing path of the plurality of processing paths, where each processing path includes one or more image processing cores, output a second selection signal SEL2 to cause selection of a second processing path of the plurality of processing paths, process the first image data IMG_DATA1 based on the first processing path, and process the second image data IMG_DATA2 based on the second processing path. The first and second processing paths may be a same processing path or different processing paths of the plurality of processing paths. In some example embodiments, the image processor may output the first and second selection signals SEL1 and SEL2 to cause selection of a single selected processing path of the plurality of processing paths and further process the first image data IMG_DATA1 and the second image data IMG_DATA2 based on the single selected processing path. An image processing core included in the selected processing path may be a configurable image processing core. The image processor 210 may provide first configuration data selected based on the first selection signal SEL1 to the image processing core included in the selected processing path and further provide second configuration data selected based on the second selection signal SEL2 to the same image processing core included in the same selected processing path.

Figure 12:
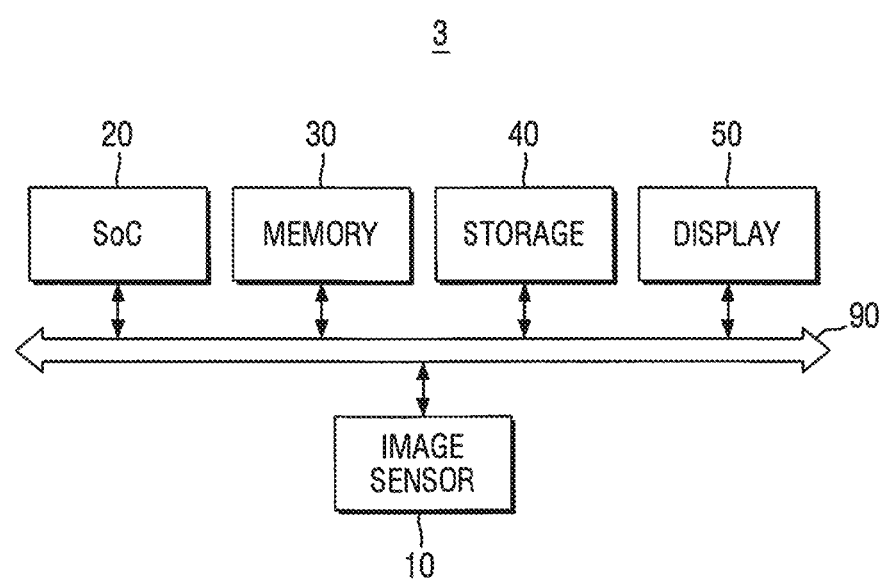
FIG. 12 is a block diagram for explaining an image processing system according to some example embodiments of the present disclosure.

FIG. 12 is a block diagram for explaining an image processing system according to some example embodiments of the present disclosure.

Referring to FIG. 12, the image processing system 3 according to some example embodiments of the present disclosure may be implemented as a computing device including the image sensor 10, the SoC 20, the memory 30, the storage 40 and the display 50 described so far. The image sensor 10, the SoC 20, the memory 30, the storage 40 and the display 50 may transmit and receive data with each other via the bus 90.

Figure 13:
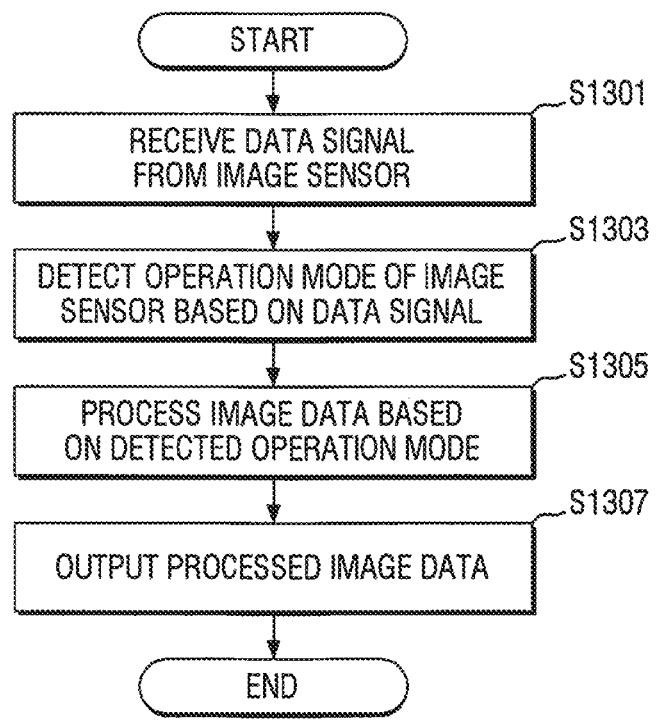
FIG. 13 is a flowchart for explaining an image processing method according to some example embodiments of the present disclosure.

FIG. 13 is a flowchart for explaining an image processing method according to some example embodiments of the present disclosure. The image processing method illustrated in FIG. 13 may be implemented by some or all of an image processing system 1 as described with reference to any of the example embodiments.

Referring to FIG. 13, the image processing method according to some example embodiments of the present disclosure includes receiving of a data signal corresponding to the input data INPUT_DATA from the image sensor, where the data signal may include receiving the input data INPUT_DATA from the image sensor (S1301).

Further, the above method includes detecting of the operation mode of the image sensor 10 based on the data signal, for example based on the input data INPUT_DATA (S1303).

In addition, the above method includes processing of the image data IMG_DATA based on the detected operation mode (S1305).

Here, the step (S1305) may include processing using at least one image processing core of the first image processing core 2120 and the second image processing core 2122 in accordance with the detected operation mode. Further, the first image processing core 2120 and the second image processing core 2122 may be configurable image processing cores, and the step (S1305) may further include providing of the configuration data CFG_DATA to at least one of the first image processing core 2120 and the second image processing core 2122.

In addition, the above method includes outputting of the processed image data IMG_DATA (S1307).

Figure 14:
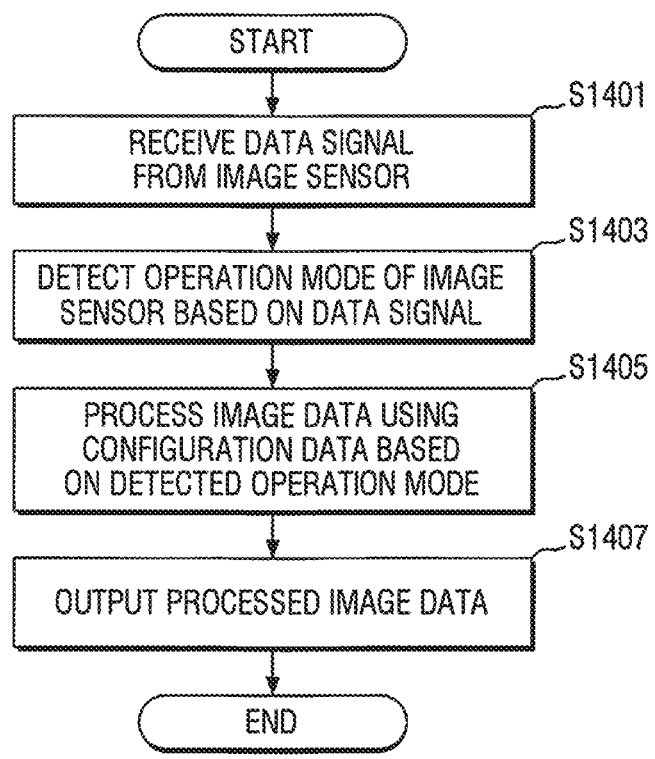
FIG. 14 is a flowchart for explaining an image processing method according to some example embodiments of the present disclosure.

FIG. 14 is a flowchart for explaining an image processing method according to some example embodiments of the present disclosure. The image processing method illustrated in FIG. 14 may be implemented by some or all of an image processing system 1 as described with reference to any of the example embodiments.

Referring to FIG. 14, the image processing method according to some example embodiments of the present disclosure includes receiving of a data signal corresponding to the input data INPUT_DATA from the image sensor 10, where the data signal may include receiving the input data INPUT_DATA from the image sensor (S1401).

In addition, the aforementioned method includes detecting of the operation mode of the image sensor 10 based on the data signal, for example based on the input data INPUT_DATA (S1403).

Further, the aforementioned method includes processing of the image data IMG_DATA in the input data INPUT_DATA, using the configuration data CFG_DATA determined in advance in association with the operation mode of the image sensor 10 (S1405). Here, the step (S1405) may include processing using at least one image processing core of the first image processing core 2120 and the second image processing core 2122 in accordance with the detected operation mode. Further, the first image processing core 2120 and the second image processing core 2122 may be configurable image processing cores. The step (S1405) may include providing the configuration data CFG_DATA to the first image processing core 2120, the second image processing core 2122, or both the first image processing core 2120 and the second image processing core 2122. The step (S1405) may include providing the configuration data CFG_DATA to at least one of the first image processing core 2120 and the second image processing core 2122.

In addition, the aforementioned above method includes outputting of the processed image data IMG_DATA (S1407).

FIG. 15 is a flowchart for explaining an image processing method according to some example embodiments of the present disclosure. The image processing method illustrated in FIG. 15 may be implemented by some or all of an image processing system 1 as described with reference to any of the example embodiments.

Referring to FIG. 15, the image processing method according to some example embodiments of the present disclosure includes receiving of a data signal corresponding to the input data INPUT_DATA from the image sensor, where the data signal may include receiving the input data INPUT_DATA from the image sensor (S1501).

Further, the aforementioned method includes detecting of the operation mode of the image sensor 10 based on the data signal, where the data signal may include receiving the input data INPUT_DATA from the image sensor (S1503).

In addition, the aforementioned method includes selecting one processing path of the plurality of processing paths, each including one or more image processing cores, and processing the image data IMG_DATA through the selected processing path (S1505).

Here, an image processing core included in the selected processing path may be a configurable image processing core. The step (S1505) may include providing the configuration data CFG_DATA to the image processing core included in the selected processing path.

In some example embodiments of the present disclosure, the step S1505 may further include processing of the image data IMG_DATA through both the selected processing path and the image processing core 2120 located outside the selected processing path (e.g., an external image processing core, an image processing core that is separate from the selected path, some combination thereof, or the like). In some example embodiments, the image processing core 2120 located outside is a configurable image processing core. The step S1505 may further include providing the configuration data CFG_DATA to the external image processing core 2121 located outside the selected processing path, the image processing cores included in the selected processing path, or both the image processing cores included in the selected processing path and the external image processing core 2121 located outside the selected processing path.

In addition, the aforementioned method includes outputting of the processed image data IMG_DATA (S1507).

According to various embodiments of the present disclosure described above, the image processer 210 directly performs an operation of receiving the input data INPUT_DATA provided from the image sensor 10 via the mode detecting module 214 and detecting the operation mode of the image sensor 10 from this (e.g., without involvement of the CPU 220). Further, the image processer 210 directly performs an operation of appropriately changing the operation of the image processing module 212 in accordance with the detected operation mode (e.g., involvement of the CPU 220). As a result, even when the image sensor 10 and the image processer 210 independently operate, by reducing or minimizing the delay time, it is possible to prevent, reduce, or minimize the distortion and delay of the output image, thereby improving performance of the image processing system 1 by improving the quality of images generated by the image processing system 1.

In concluding the detailed description, those skilled in the art will appreciate that many variations and modifications may be made to the example embodiments described herein without substantially departing from the principles of the present disclosure. Therefore, the example embodiments of the disclosure are used in a generic and descriptive sense only and not for purposes of limitation.

What is claimed is:
1. An image processing system, comprising:
    an image sensor configured to capture an image of a subject to generate an input data, wherein the input data includes an image data and a side-band data; and
    an image processing circuitry including
        a memory configured to store a program of instructions, and
        processing circuitry configured to execute the program of instructions to
        receive the input data from the image sensor and detect an operation mode of the image sensor based on the input data,
        provide configuration data determined in association with the operation mode of the image sensor, and
        process image data in the input data in accordance with the operation mode and the configuration data.
2. The image processing system of claim 1, wherein
the processing circuitry is configured to execute the program of instructions to
    output a selection signal to cause selection of a first image processing core, a second image processing core, or both the first and second image processing cores as a selected image processing core, and
    process the image data, using the selected image processing core.
3. The image processing system of claim 2, wherein
the first image processing core and the second image processing core are configurable image processing cores, and
the processing circuitry is configured to execute the program of instructions to select and provide a particular instance of configuration data to the first image processing core, the second image processing core, or both the first and second image processing cores, based on the selection signal.
4. The image processing system of claim 1, wherein
the processing circuitry is configured to execute the program of instructions to output a selection signal which causes selection of one processing path of a plurality of processing paths as a selected processing path, each processing path of the plurality of processing paths including one or more image processing cores, and
process the image data via the selected processing path.
5. The image processing system of claim 4, wherein
an image processing core included in the selected processing path is a configurable image processing core, and
the processing circuitry is configured to execute the program of instructions to select and provide a particular instance of configuration data to the image processing core included in the selected processing path based on the selection signal.
6. The image processing system of claim 4, wherein the processing circuitry is configured to execute the program of instructions to
    process the image data, through an external image processing core, that is separate from the plurality of processing paths, and the selected processing path.
7. The image processing system of claim 6, wherein
the external image processing core is a configurable image processing core, and
the processing circuitry is configured to execute the program of instructions to select a particular instance of configuration data based on the selection signal and provide the particular instance of configuration data to the external image processing core, an image processing core included in the selected processing path, or both the external image processing core and the image processing core included in the selected processing path.

8. The image processing system of claim 1, wherein the input data includes the image data, and the side-band data includes additional information associated with the image data.

9. The image processing system of claim 1, wherein
the processing circuitry is configured to execute the program of instructions to
receive first input data from a first image sensor and detect a first operation mode of the first image sensor based on the first input data,
receive second input data from a second image sensor and detect a second operation mode of the second image sensor based on the second input data,
process first image data included in the first input data in accordance with the first operation mode, and
process second image data included in the second input data in accordance with the second operation mode.

10. The image processing system of claim 9, wherein the processing circuitry is configured to execute the program of instructions to
provide first configuration data determined in association with the first operation mode, and
provide second configuration data in association with the second operation mode.

11. An image processing system, comprising:
an image sensor configured to capture an image of a subject to generate input data, wherein the input data includes an image data and a side-band data; and
an image processing circuitry including
a memory configured to store a program of instructions, and
processing circuitry configured to execute the program of instructions to
receive the input data from the image sensor and detect an operation mode of the image sensor based on the input data, and
process the image data in the input data through a selected processing path of a plurality of processing paths, the selected processing path selected in accordance with the operation mode, each processing path including one or more image processing cores.

12. The image processing system of claim 11, wherein the processing circuitry is configured to execute the program of instructions to output a selection signal to cause selection of the selected processing path of the plurality of processing paths in accordance with the operation mode.

13. The image processing system of claim 12, wherein
the processing circuitry is configured to execute the program of instructions to select and provide a particular instance of configuration data determined in association with the operation mode of the image sensor, based on the selection signal,
an image processing core included in the selected processing path is a configurable image processing core, and
the processing circuitry is configured to execute the program of instructions to provide the particular instance of configuration data to the image processing core included in the selected processing path.

14. The image processing system of claim 12, wherein the processing circuitry is configured to execute the program of instructions to
process the image data, through an external image processing core, that is separate from the plurality of processing paths, and the selected processing path.

15. The image processing system of claim 14, wherein
the processing circuitry is configured to execute the program of instructions to select and provide a particular instance of configuration data determined in association with the operation mode of the image sensor based on the selection signal,
the external image processing core is a configurable image processing core, and
the processing circuitry is configured to execute the program of instructions to provide the particular instance of configuration data to the external image processing core, an image processing core included in the selected processing path, or both the external image processing core and the image processing core included in the selected processing path.

16. An image processing system, comprising:
an image sensor configured to capture an image of a subject to generate input data, wherein the input data includes an image data and a side-band data; and
an image processing circuitry including
a memory configured to store a program of instructions, and
processing circuitry configured to execute the program of instructions to
receive first input data from a first image sensor and detect a first operation mode of the first image sensor based on the first input data,
receive second input data from a second image sensor and detect a second operation mode of the second image sensor based on the second input data,
provide first configuration data determined in association with the first operation mode,
process first image data included in the first input data in accordance with the first operation mode and the first configuration data,
provide second configuration data determined in association with the second operation mode, and
process second image data included in the second input data in accordance with the second operation mode and the second configuration data.

17. The image processing system of claim 16, wherein
the processing circuitry is configured to execute the program of instructions to
output a first selection signal and a second selection signal to cause selection of at least one image processing core among a first image processing core and a second image processing core as a selected at least one image processing core, and
process the first image data and the second image data, using the selected at least one image processing core.

18. The image processing system of claim 17, wherein
the first image processing core and the second image processing core are configurable image processing cores,
the processing circuitry is configured to execute the program of instructions to select and provide the first configuration data to at least one first image processing core of the first image processing core and the second image processing core, based on the first selection signal and the second selection signal, and
the processing circuitry is configured to execute the program of instructions to select and provide the second configuration data to at least one second image processing core of the first image processing core and the second image processing core, based on the first selection signal and the second selection signal.

19. The image processing system of claim 16, wherein
the processing circuitry is configured to execute the
program of instructions to
output a first selection signal and a second selection
signal to cause selection of a selected processing
path of a plurality of processing paths, each processing path of the plurality of processing paths including one or more image processing cores, and
process the first image data and the second image data
based on the selected processing path.

20. The image processing system of claim 19, wherein
an image processing core included in the selected processing path is a configurable image processing core,
the processing circuitry is configured to execute the
program of instructions to provide the first configuration data selected based on the first selection signal to
the image processing core included in the selected
processing path, and
the processing circuitry is configured to execute the
program of instructions to provide the second configuration data selected based on the second selection
signal to the image processing core included in the
selected processing path.

* * * * *